United States Patent
Sharma et al.

(10) Patent No.: US 9,883,052 B2
(45) Date of Patent: Jan. 30, 2018

(54) SYSTEMS AND METHODS FOR AVOIDING DOUBLE ACCOUNTING UPON SESSION FAILOVER

(71) Applicant: Alcatel-Lucent USA Inc., Murray Hill, NJ (US)

(72) Inventors: Ranjan Sharma, New Albany, OH (US); Yigang Cai, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 15/192,924

(22) Filed: Jun. 24, 2016

(65) Prior Publication Data
US 2017/0374203 A1    Dec. 28, 2017

(51) Int. Cl.
*H04M 15/00*  (2006.01)
*H04L 29/12*  (2006.01)
*H04W 8/02*  (2009.01)

(52) U.S. Cl.
CPC .... *H04M 15/8214* (2013.01); *H04L 61/1588* (2013.01); *H04W 8/02* (2013.01)

(58) Field of Classification Search
CPC ...... H04M 15/00; H04M 15/41; H04M 15/43; H04M 15/55; H04M 15/57; H04M 15/82; H04M 15/8228; H04M 15/31; H04M 11/00; H04M 2215/0164; H04M 2215/2026; H04M 2215/2046; H04M 2215/208; H04M 2215/78; H04M 2215/7833; H04M 2215/96; H04W 4/24
See application file for complete search history.

(56) References Cited

U.S. PATENT DOCUMENTS 8,977,233 B2 *  3/2015  Sharma .............. H04L 12/1403
                                                      379/114.01
9,438,746 B2 *  9/2016  Cai .................... H04L 12/14
                        (Continued)

FOREIGN PATENT DOCUMENTS

EP        2083533 A1        7/2009

OTHER PUBLICATIONS

ETSI TS 132 252 v7.0.0 (Jun. 2007) Digital cellular telecommunications system (phase 2+); UMTS; Telecommunication management; Charging management; WLAN Charging (3GPP TS 32.252 Version 7.0.0 Release 7).*
(Continued)

Primary Examiner — Nizar Sivji
(74) Attorney, Agent, or Firm — Duft Bornsen & Fettig, LLP (57) ABSTRACT

Systems, methods, and software that perform offline charging. One embodiment comprises a Charging Data Function (CDF) of an Offline Charging System (OFCS). The CDF receives accounting requests for a session from a Charging Trigger Function (CTF), and generates an incomplete Charging Data Record (CDR) for the session based on the accounting requests. The CDF identifies request identifiers (ID) assigned to the accounting requests used to generate the first incomplete CDR, and inserts the request IDs in the incomplete CDR. The CDF determines whether one or more of the accounting requests used to generate the incomplete CDR were indicated as a re-transmitted accounting request by the CTF, and inserts content information for the re-transmitted accounting request(s) in the incomplete CDR.

20 Claims, 6 Drawing Sheets

(56) References Cited

U.S. PATENT DOCUMENTS

| | | |
|---|---|---|
| 2004/0167834 A1 | 8/2004 | Koskinen et al. |
| 2008/0181378 A1* | 7/2008 | Cai ...................... H04M 15/00 |
| | | 379/121.01 |
| 2009/0209229 A1* | 8/2009 | Cai .................... H04L 12/1403 |
| | | 455/406 |
| 2012/0123914 A1* | 5/2012 | Sharma ................ H04M 15/00 |
| | | 705/30 |
| 2012/0224531 A1* | 9/2012 | Karuturi ............... H04W 40/02 |
| | | 370/328 |
| 2015/0189097 A1 | 7/2015 | Sharma |

OTHER PUBLICATIONS

3GPP TS 32.298, Charging Management; Charging Data Record (CDR) Parameter Description, version 11.15.0 (Dec. 2015).

\* cited by examiner

SYSTEMS AND METHODS FOR AVOIDING DOUBLE ACCOUNTING UPON SESSION FAILOVER

TECHNICAL FIELD

The present disclosure is related to the field of communication systems and, in particular, to offline charging.

BACKGROUND

Service providers typically provide numerous voice and data services to end users (also referred to as subscribers). Examples of voice services are voice calls, call forwarding, call waiting, etc. Examples of data services are streaming audio, streaming video, Voice over Internet Protocol (VoIP), online gaming, and IP-TV. The data services are managed by a packet core network, which interfaces the end user with external Packet Data Networks (PDN), such as the Internet. Some examples of packet core networks are a General Packet Radio Service (GPRS) core network, an Evolved Packet Core (EPC) of a Long Term Evolution (LTE) network, etc. Mobile devices, such as cell phones, personal data assistants, smart phones, notebook computers, etc., may access the data services provided by the networks over an air interface with one or more base stations.

The service providers use offline and online charging functions to keep track of the resource usage incurred by each device accessing the various services. The 3GPP/3GPP2 standards groups have defined a set of specifications that may be used to implement online charging systems and offline charging systems in the various network domains (e.g., a circuit-switched domain, a packet-switched domain, and/or a wireless domain), IP multimedia subsystems, and emerging 3G/OMA application services.

According to 3GPP TS 32.240, offline charging is a process where charging information for network resource usage is collected concurrently with the resource usage. The charging information is passed through a chain of charging functions, which results in the generation of Charging Data Record (CDR) files that are transferred to the network operator's Billing Domain for subscriber billing and/or inter-operator accounting. To implement offline charging, a Charging Trigger Function (CTF) is implemented in a network element that provides a service. The CTF collects information pertaining to chargeable events, assembles this information into matching charging events, and sends the charging events to a Charging Data Function (CDF), which may be implemented in the network element or in the Offline Charging System (OFCS). The charging events may be provided by the CTF in an accounting request, such as a Diameter Accounting Request (ACR).

The CDF receives the charging events from one or more CTFs, and uses the information included in the charging events to construct CDRs. A CDR is a formatted collection of information about a chargeable event (e.g., time of call or session set-up, time of call or session tear-down, amount of data transferred, etc.) for use in billing and accounting. The CDF then sends the CDRs to a Charging Gateway Function (CGF) of the OFCS. The CGF acts as a gateway between the network and the billing domain. Therefore, the CGF collects CDRs from the CDF (and other CDFs), optionally correlates the CDRs and writes the CDRs into a CDR file, and makes the CDR file available to the billing domain.

SUMMARY

Embodiments described herein provide for handling of re-transmitted accounting requests (e.g., Diameter Accounting Request (ACR)) from a CTF. When CDFs of an OFCS receive accounting requests for a session from a CTF, the CDFs generate a CDR for the session based on the accounting requests, and insert identifiers for the accounting requests that are used to construct the CDR into a field of the CDR. The CDFs also insert content information into a field of the CDR for any accounting requests that are identified as re-transmitted by the CTF. Because this information is inserted into the CDFs, a reconciliation device is able to identify which accounting requests have been duplicated in the CDRs due to a re-transmitted accounting request, and remove any duplicate charging information from the CDRs. That way, a network operator can avoid a situation where an end user is double billed for a service because of a re-transmitted accounting request.

One embodiment comprises a system that implements a plurality of CDFs of an OFCS. A first CDF is configured to receive accounting requests for a session from a CTF. The first CDF is configured to generate a first incomplete CDR for the session based on the accounting requests, to identify request identifiers (ID) assigned to the accounting requests used to generate the first incomplete CDR, and to insert the request IDs in a first extended field of the first incomplete CDR. The first CDF is configured to determine whether one or more of the accounting requests used to generate the first incomplete CDR was indicated as a re-transmitted accounting request by the CTF, and to insert content information for the re-transmitted accounting request in a second extended field of the first incomplete CDR.

In another embodiment, the first CDF is configured to insert payload from the re-transmitted accounting request in the second extended field of the first incomplete CDR.

In another embodiment, the payload comprises at least a start timestamp and an end timestamp for a chargeable event as indicated in an Attribute Value Pair (AVP) of the re-transmitted accounting request.

In another embodiment, the first CDF is configured to insert a pointer in the second extended field of the first incomplete CDR, where the pointer points to a shared data storage that stores payload from the re-transmitted accounting request.

In another embodiment, the accounting requests comprise Diameter Accounting Requests (ACRs), and the first CDF is configured to process a T-bit of a command flags field of the ACRs to determine that one or more of the ACRs was indicated as a re-transmitted ACR by the CTF.

In another embodiment, the request IDs comprise Accounting Record Numbers (ARN) assigned to the ACRs.

In another embodiment, a reconciliation system is configured to receive incomplete CDRs from the first CDF and a second CDF, and to generate a complete CDR based on the incomplete CDRs. The reconciliation system is configured to process the first extended field of the incomplete CDRs to identify a request ID that is duplicated among two of the incomplete CDRs, to process the second extended field of the incomplete CDRs to identify the content information related to the request ID found to be duplicated among two of the incomplete CDRs, and to remove duplicate charging information from the complete CDR based on the content information related to the duplicate request ID.

In another embodiment, the reconciliation system comprises a Charging Gateway Function (CGF) of the OFCS.

In another embodiment, the reconciliation system comprises a Billing Mediation (BS) system that connects to the OFCS.

Another embodiment comprises a method of performing offline charging in an OFCS that includes a plurality of CDFs. The method includes receiving accounting requests for a session from a CTF, and generating a first incomplete CDR for the session based on the accounting requests. The method further includes identifying request identifiers (ID) assigned to the accounting requests used to generate the first incomplete CDR, and inserting the request IDs in a first extended field of the first incomplete CDR. The method further includes determining whether one or more of the accounting requests used to generate the first incomplete CDR was indicated as a re-transmitted accounting request by the CTF, and inserting content information for the re-transmitted accounting request in a second extended field of the first incomplete CDR.

Another embodiment comprises a non-transitory computer readable medium embodying programmed instructions executed by at least one processor to implement a plurality of CDFs of an OFCS. The instructions direct the processor to receive accounting requests for a session from a CTF, and generate a first incomplete CDR for the session based on the accounting requests. The instructions direct the processor to identify request identifiers (ID) assigned to the accounting requests used to generate the first incomplete CDR, and insert the request IDs in a first extended field of the first incomplete CDR. The instructions direct the processor to determine whether one or more of the accounting requests used to generate the first incomplete CDR was indicated as a re-transmitted accounting request by the CTF, and insert content information for the re-transmitted accounting request in a second extended field of the first incomplete CDR.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the disclosure are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
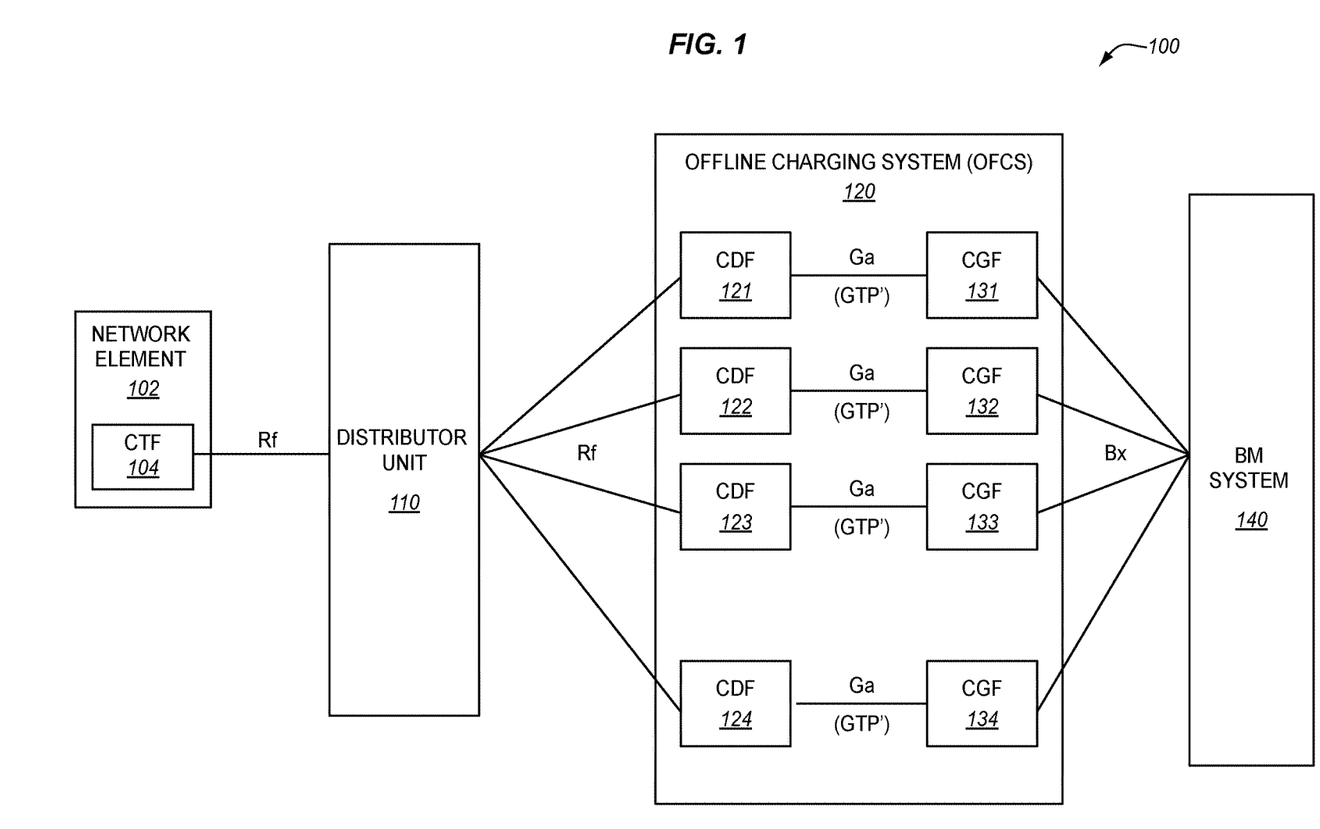
FIG. 1 illustrates an offline charging architecture in an exemplary embodiment.

FIG. 1 illustrates an offline charging architecture 100 in an exemplary embodiment. Architecture 100 may be implemented in a circuit-switched network or a packet-switched network that provides services to its subscribers (i.e., an end user and associated User Equipment (UE)) to provide offline charging for the subscribers. Some exemplary networks include IP Multimedia Subsystem (IMS) networks, Long Term Evolution (LTE) networks, General Packet Radio Service (GPRS), etc.

Architecture 100 is a system or systems for performing offline charging. Architecture 100 includes a network element 102 that connects to an offline charging system (OFCS) 120 through a distributor unit 110. A network element 102 is an apparatus or equipment used in the provision of services provided by a network. For example, a network element may comprise a Serving-Call Session Control Function (S-CSCF) or application server (AS) of an IMS network, a Serving Gateway (SGW) or a Packet Data Network Gateway (PGW) of an LTE network, etc. Network element 102 includes a Charging Trigger Function (CTF) 104 that detects chargeable events for services provided by network element 102, assembles information for the chargeable events into matching charging events, and sends the charging events to a Charging Data Function (CDF). In the case of network element 102, CTF 104 may use a Diameter Rf interface. CTF 104 assembles the charging information into accounting requests, such as a Diameter Rf Accounting Request (ACR). Although one CTF 104 is illustrated in FIG. 1, there may be many CTFs in contact with distributor unit 110. Although not specifically illustrated in FIG. 1, network element 102 may include a processor or other hardware component to implement CTF 104.

Diameter protocol is shown as the charging protocol in FIG. 1. However, other charging protocols may be used. Therefore, reference to an accounting request or accounting answer as discussed herein may refer to Diameter protocol (e.g., ACR or ACA) or another charging protocol.

Figure 2:
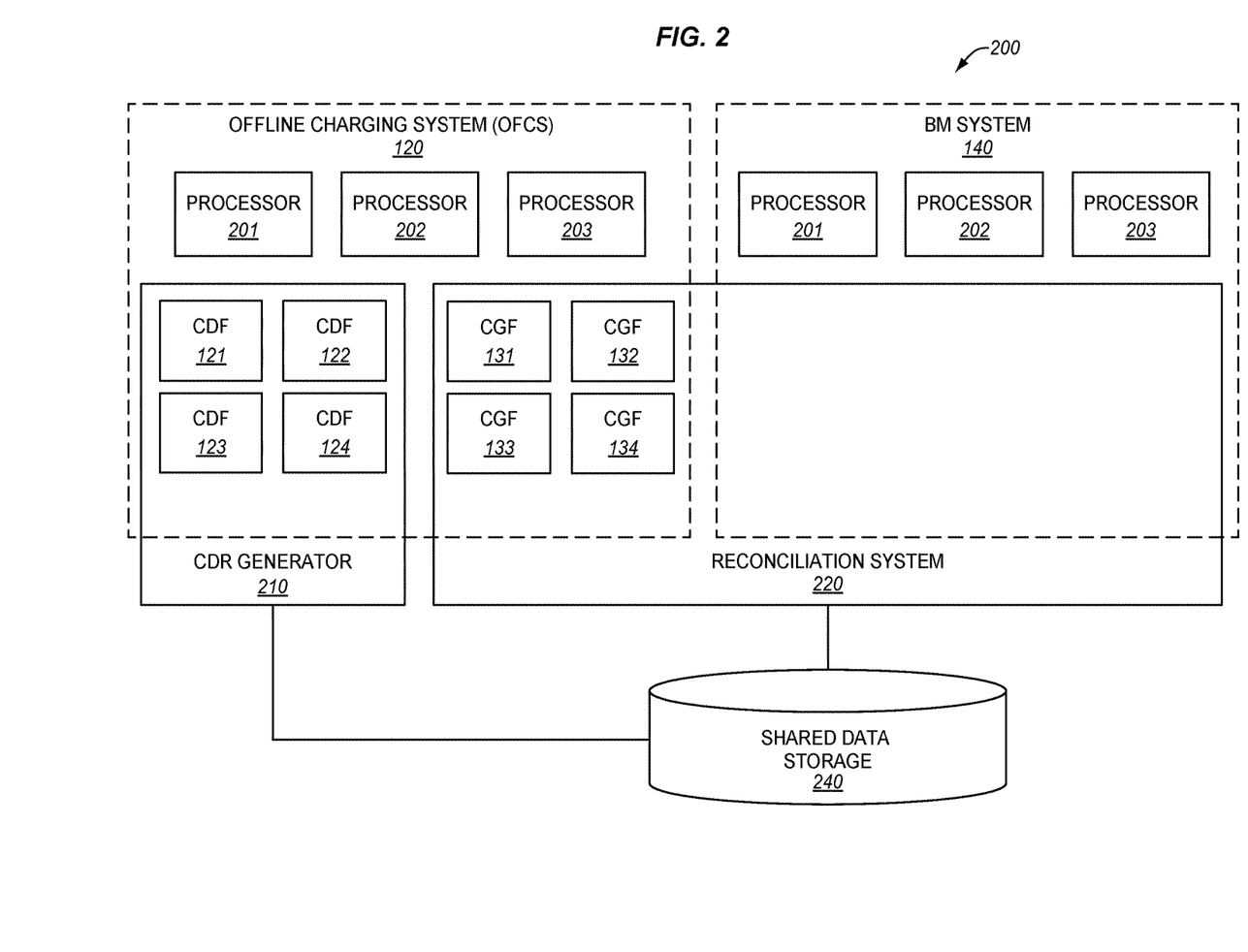
FIG. 2 is a block diagram of an offline charging architecture in an exemplary embodiment.

OFCS 120 is an apparatus, a server, a device, or equipment configured to implement offline charging for sessions or services provided by a network. Offline charging can be of two types: session-based or event-based. In event-based charging, the CTF reports the usage or the service rendered where the service offering is rendered in a single operation, such as subscriber registration, re-registration, de-registration, etc. The CTF reports the usage in an accounting request of type "event" (e.g., ACR EVENT). Session-based charging is the process of reporting usage reports for a session, and uses the START, INTERIM, and STOP accounting data. During a session, CTF 104 may transmit 0, 1, or multiple interim accounting requests depending on the proceeding of the session. In this embodiment, OFCS 120 includes a plurality of CDFs (CDF1-CDFn) 121-124. A CDF comprises an element or module within OFCS 120 that receives charging events from CTFs within network elements, formats the charging events into CDRs, and sends the CDRs to a CGF. OFCS 120 also includes a plurality of CGFs (CGF1-CGFn) 131-134. A CGF comprises an element or module within OFCS 120 that correlates CDRs for a session, and forwards a CDR file with the correlated CDRs to a billing domain 140. Billing mediation (BM) system 140 is the part of the operator network that receives and processes CDR files for billing mediation and other billing applications (e.g., statistical applications). The CDFs in OFCS 120 may communicate with the CGFs over a Diameter Ga interface. In the case shown in FIG. 1, GTP' may be used on the Ga interface to transport CDRs from the CDFs to the CGFs. While a 1:1 relationship is shown between the CDFs and CGFs in FIG. 1, an N:1 relationship is also possible. Although not specifically illustrated in FIG. 1, OFCS 120 may include one or more processors or other hardware components that implement CDFs 121-124 and CGFs 131-134, such as is shown in FIG. 2.

Distributor unit 110 may be implemented between CTFs (e.g., CTF 104) and the CDFs 121-124 in OFCS 120. The purpose of distributor unit 110 is to distribute accounting requests (e.g., Diameter ACRs) from CTFs among the multiple CDFs 121-124 within OFCS 120. An accounting request comprises a message for offline charging that reports a charging event, one example of which is a Diameter ACR. Although distributor unit 110 is illustrated as being outside of OFCS 120, distributor unit 110 may be implemented on the same platform as OFCS 120. Also, distributor unit 110 may be excluded in other embodiments, as CTF 104 may directly connect to CDFs 121-124.

In the context of offline charging, CTF 104 may failover from one CDF 121-124 to another in the middle of an accounting session upon concluding that the first CDF is unreachable or unresponsive. This is usually done via monitoring the path between CTF 104 and the first CDF at the higher protocol level (e.g., Diameter over either SCTP or TCP/IP via Device Watchdog Request (DWR)/Device Watchdog Answer (DWA) mechanism), or at the level of transmission protocol itself, which is usually faster than the DWR/DWA mechanism. As a result, CTF 104 may send part of the accounting session to one CDF, and the remaining to the other CDFs, assuming there are no further glitches.

Besides the DWR/DWA mechanism that is used periodically, CTFs may use a timeout mechanism for each accounting request (e.g., Diameter ACR) that they send to a CDF. A timer is started at the CTF for each accounting request it sends. If the CTF does not receive an accounting answer (e.g., Diameter ACA), then ACR delivery was not successful.

When the initially transmitted ACR goes unanswered, the CTF may re-transmit the ACR a fixed number of times to the original CDF. The re-transmitted ACR includes a flag indicating that the ACR is re-transmitted. For example, a re-transmitted ACR may be sent with the T-flag set in the Diameter header to declare it as a "potentially re-transmitted" ACR. From the CTF perspective, the CTF is unable to determine whether (a) the CDF in question never received the original ACR due to network issues or (b) the CDF in question received the original ACR, but the response thereto was never delivered to the CTF due to network or other issues. In certain cases, if the original ACR was received by the CDF, the re-transmitted ACR may be discarded. In other cases, when a failover actually occurs, the re-transmitted ACR is sent to another CDF and the new CDF simply accepts it, even though it is marked as a potentially duplicate ACR. The new CDF, when generating the CDR at the end of the accounting session (be it partial CDR or final session CDR), marks the CDR as being constructed from using a re-transmitted ACR, as the CDRs produced in such cases have a simple indication if a re-transmitted ACR was used in the construction of the CDR.

A simple indication that a re-transmitted ACR was used to construct a CDR is not sufficient to reconcile charging for a session. The following illustrates examples of a conventional way of handling a re-transmitted ACR.

Example 1

(1) CTF→ACRn→CDF1
(2) CTF does not receive a response
(3) CTF→ACRn with T-flag set→CDF1 (retry)
(4) CTF←ACA←CDF1

Assume the reason that the CTF did not receive a response from the CDF1 to the original ACRn was a temporary route failure. For example, a Diameter relay may fail and was Out-of-Service (OOS) for a period of time larger than the timer set on the CTF to expect a response. When the CTF re-transmits the ACR at step (3), the network takes this ACR via a different route to the CDF1. The ACR is registered and acknowledged. When the Diameter relay is back in service, it replays the buffered messages that were not sent before it went OOS. Therefore, the following steps occur:

5. →Diameter Relay→ACRn→CDF1
6. CTF←ACA←CDF1

In the edge case, with ACRn being an ACR Stop message, steps 1-4 produced a complete CDR, with indication that it encompasses a re-transmitted ACR (ACRn). Steps 5-6 also produce a CDR, which is an incomplete CDR, with just ACRn.

Example 2

(1) CTF→ACRm→CDF1
(2) CTF does not receive a response
(3) CTF→ACRm with T-flag set→CDF1 (retry)
(4) CTF does not receive a response and fails over to CDF2
(5) CTF→ACRm→CDF2 with T-flag set
(6) CTF←ACA←CDF2
(7) Further messages until the end of the session In this case, the first part of the session was handled at the CDF1, and the CTF cannot determine if ACRm was received and used at the CDF1. Also, the billing mediation (BM) likewise cannot determine the overlap between the two CDRs. Further complications are possible at steps 2 through 5. The CDF1 may have received the ACRm, but the ACAm was lost in the transmission. Therefore, the CDR created at the CDF1 would include ACRm, and it may not contain any re-transmission indication. Or, if the ACR at step 1 was missed, but the ACR at step 3 was received, then the generated CDR would contain the re-transmission indicator. In this case, the failover for the CTF would not be necessary.

Example 3

When a distributor unit 110 (DU) is implemented between the CTF and the CDFs as illustrated in FIG. 1, in-session recovery of a previously failed CDF can force the session back to a restored CDF as follows:

(1) CTF→DU→ACRm CDF1
(2) CTF does not receive a response
(3) CTF→DU→ACRm with T-flag set CDF1 (retry)
(4) CTF does not receive a response and fails over to CDF2
(5) CTF→DU→ACRm→CDF2 with T-flag set
(6) CTF←DU←ACA←CDF2
(7) Additional ACR/ACA between the CTF and CDF2 until CDF2 develops an error (8) CTF→DU→ACRn→CDF2
(9) CTF does not receive a response
(10) CTF DU ACRn with T-flag set CDF2 (retry)
(11) CTF does not receive a response and fails back to CDF1, which has now recovered
(12) Further messages until the end of the session In this case, both the CDF1 and CDF2 would show "incomplete CDRs" and the "re-transmission" indicator would be set. Since both "m" and "n" are variables that are not known, the BM would not be able to reconcile between these CDRs, as both CDRs would probably overlap.

Other examples are possible indicating the problems with re-transmitted ACRs, as re-transmitted ACRs add uncertainty about session coverage and the extent of overlap of charging information for the session. When it comes to LTE, the CDF reports usage containers. These containers reflect service differentiation used in flow-based bearer charging, where the PDN Gateway (PGW) reports usage in SDC (Service Data Containers) and the Serving Gateway (SGW) reports usage in TDV (Traffic Data Volume) containers. The reporting based on containers is an added complexity and downstream system (BM in this case) is tasked with reconciling the CDRs with different containers, some of which may be repeated across two or more CDRs, with the simple indication that the CDRs used re-transmitted information. Presently, there is no "re-transmission" field included in the PGW and SGW CDRs.

Detecting use of re-transmitted ACRs across multiple CDRs produced for the same session is possible. Reconciling the CDRs via removal of any overlapping information is difficult. As a consequence, such CDRs are routinely discarded and the network operator faces revenue leaks. The following embodiments describe a way to avoid revenue leak by inserting additional information in CDRs that are constructed using re-transmitted ACRs.

FIG. 2 is a block diagram of offline charging architecture 100 in an exemplary embodiment. OFCS 120 includes one or more processors 201-203 that execute instructions to perform offline charging functions. Processors 201-203 may represent hardware elements, such as blade servers. A blade server is a server chassis that houses multiple electronic circuit boards known as server blades. Each blade is considered a server, and is typically dedicated to a single application. Each CDF instance and CGF instance of OFCS 120 may be provided by an application blade of a blade server. Processors 201-203 may also represent virtual machines (VM). A virtual machine is a software computer that runs an operating system and one or more applications, which imitates hardware. Specialized software called a "hypervisor" emulates a Central Processing Unit (CPU), memory, hard disk, network, and other hardware resources. Many VMs are able to share the physical resources of a host, and a pool of distributed hardware resources from different hardware platforms may be used to implement multiple VMs. Each CDF instance and CGF instance of OFCS 120 may be provided by one or more VMs.

BM system 140 includes one or more processors 205-207 that execute instructions to perform mediation functions. CDFs 121-124, CGFs 131-134, and BM system 140 may each have access to a shared data storage 240. Shared data storage 240 comprises any medium for storing data.

Each CDF instance of OFCS 120 is designed to generate CDRs based on accounting requests (e.g., ACR) received from CTFs. Therefore, CDFs 121-124 are illustrated as part of a CDR generator 210. Each CGF 131-134 is able to execute a reconciliation process on CDRs. CDR reconciliation is a process of matching CDRs from two or more different sources to find discrepancies among them. Therefore, CGFs 131-134 are illustrated as part of a reconciliation system 220. BM system 140 may also be able to execute a reconciliation process on CDRs, so BM system 140 is also illustrated as part of reconciliation system 220.

In the embodiments described herein, CDFs 121-124 are enhanced to insert additional information into CDRs. When a CDF generates a CDR which uses one or more potentially duplicate ACRs, the CDF inserts indicators of the ACRs used to generate the CDR. For example, an Accounting Record Number (ARN) is assigned or designated for each ACR of a session, and the CDF may insert a list of one or more of the ARNs in the CDR for the ACRs used to construct the CDR. The CDF also inserts content information for one or more ACRs that were potentially re-transmitted by a CTF. The content information indicates the content of the re-transmitted ACR that was used in CDR generation. For example, the content information may comprise a pointer that points to shared data storage 240 where the content of the re-transmitted ACR is stored. In another example, the content information may comprise the actual content of the re-transmitted ACR. The CDF may also insert an indicator that the CDR has used a potentially re-transmitted ACR (including extension of the standard PGW and SGW formats to include this indicator in the Record Extension part as a proprietary extension before standardization).

Reconciliation system 220 is also enhanced to process CDRs that provide an indication that they were built using re-transmitted ACRs, and remove duplicate data from the CDRs to avoid double accounting.

Figure 3:
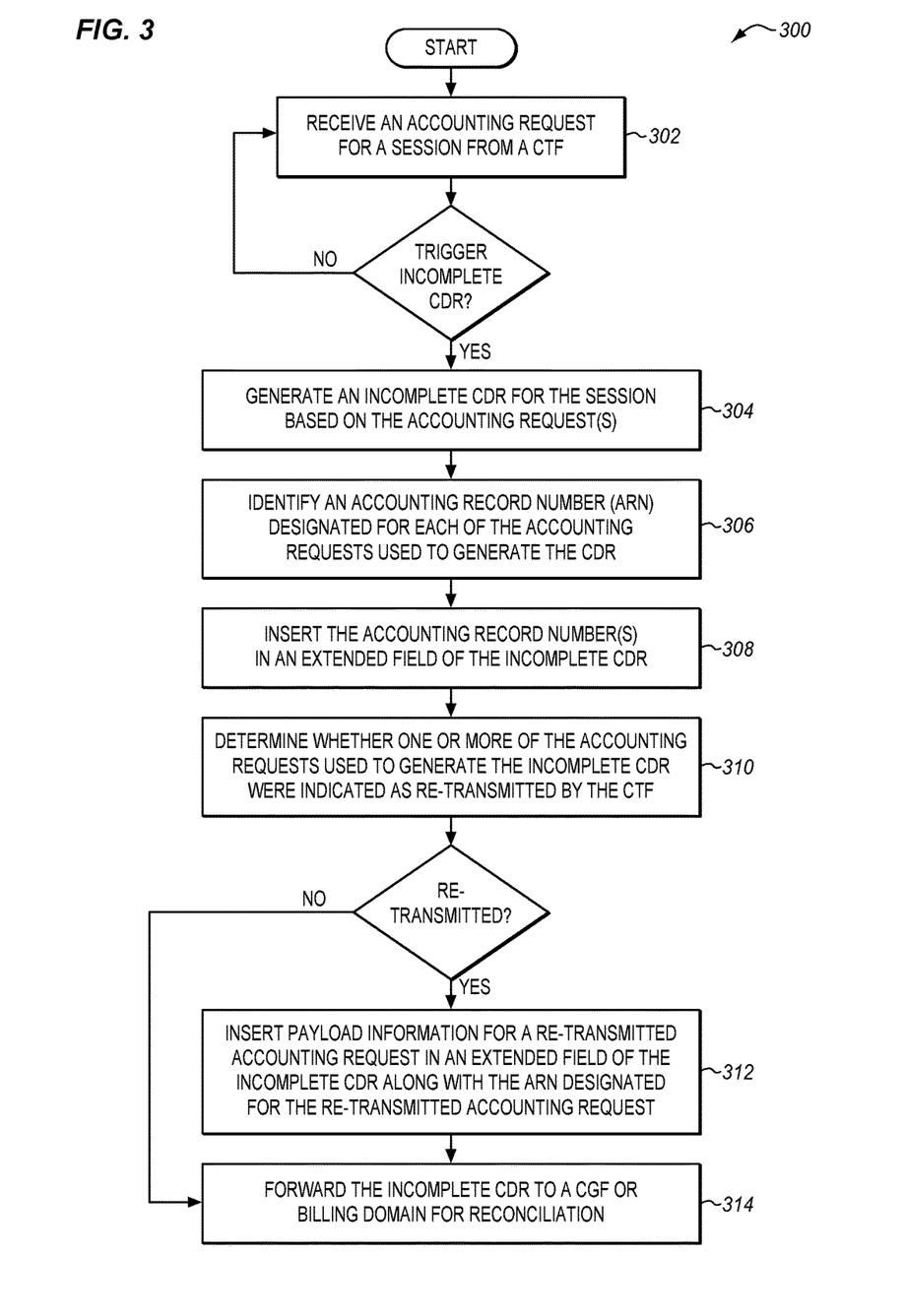
FIG. 3 depicts a flow chart illustrating a method for generating CDRs in an exemplary embodiment.

FIG. 3 depicts a flow chart illustrating a method 300 for generating CDRs in an exemplary embodiment. The steps of method 300 will be described with reference to the offline charging architecture 100 in FIGS. 1-2, but those skilled in the art will appreciate that method 300 may be performed in other systems. Also, the steps of the flow charts described herein are not all inclusive and may include other steps not shown, and the steps may be performed in an alternative order.

Assume for this embodiment that network element 102 of FIG. 1 provides a service or services for a session. CTF 104 within network element 102 detects chargeable events for the services provided by network element 102, and CTF 104 assembles information for the chargeable event into accounting requests (e.g., start, interim, or stop). For example, the accounting requests may comprise Diameter Rf ACRs. CTF 104 then sends the accounting requests for the session toward OFCS 120. The "session" as described herein may refer to a charging session, an accounting session, or a Diameter session.

If a distributor unit 110 is implemented as in FIG. 1, then distributor unit 110 receives the accounting requests from CTF 104, and operates to route the accounting requests to CDFs 121-124. One of the CDFs (assume CDF 121) receives one or more accounting requests for the session from CTF 104 (step 302), such as through distributor unit 110. At some point, CDF 121 will trigger CDR generation for the session. The trigger for generation of a CDR may be the reception of a first accounting request for a session (or a request of type "Event"), which instantiates a CDR. The CDR may be finalized upon (a) reception of a subsequent request of type "Stop", (b) reception of a subsequent request of type "Interim", or (c) non-reception of a subsequent request within a time period (e.g., timer set for the session via Acct-Interim-Interval). CDF 121 therefore generates or creates a CDR for the session based on the accounting request(s) received in CDF 121 for the session (step 304). It is assumed in this embodiment that CDF 121 does not receive a complete set of accounting requests for the session (i.e., both a start and stop), so the CDR generated by CDF 121 is considered an "incomplete" CDR. CDF 121 identifies a request identifier (ID) assigned to each of the accounting requests used to generate the incomplete CDR (step 306). One example of a request ID is an Accounting Record Number (ARN) that is assigned to each accounting request. CDF 121 then inserts the request ID(s) in an extended field of the incomplete CDR (step 308). As will be described in further detail below, extensions to the CDR structure are proposed herein. CDF 121 may use one of the extensions to the CDR structure to insert the request ID(s) in the incomplete CDR.

CDF 121 also determines whether one or more of the accounting requests used to generate the incomplete CDR was indicated as a re-transmitted accounting request by CTF 104 (step 310). For example, if the accounting requests comprise Diameter ACRs, then CDF 121 may process a T-bit of a command flags field of an ACR to determine whether the ACR was indicated as a re-transmitted ACR by CTF 104. CDF 121 then inserts content information for the re-transmitted accounting request in an extended field of the incomplete CDR (step 312). CDF 121 may use one of the extensions to the CDR structure to insert the content information for the re-transmitted accounting request in the incomplete CDR. CDF 121 may insert the actual content of the re-transmitted accounting request into the extended field of the incomplete CDR. Alternatively, CDF 121 may store the actual content of the re-transmitted accounting request in shared data storage 240, and insert a pointer in the incomplete CDR that points to a location of shared data storage 240 where the actual content of the re-transmitted accounting request is stored. CDF 121 then forwards the incomplete CDR to a CGF 131-134 or BM system 140 (step 314).

Each CDF 121-124 that receives accounting requests for the session operates according to method 300 to generate CDRs for the session. For example, CDF 122 may receive one or more accounting requests for the session from CTF 104 (step 302). At some point, CDF 122 generates another incomplete CDR for the session based on the accounting request(s) (step 304). CDF 122 identifies a request ID assigned to each of the accounting requests used to generate the incomplete CDR (step 306). CDF 122 inserts the request ID(s) in an extended field of the incomplete CDR (step 308). CDF 122 also determines whether one or more of the accounting requests used to generate the incomplete CDR was indicated as a re-transmitted accounting request by CTF 104 (step 310). CDF 122 inserts content information for the re-transmitted accounting request in an extended field of the incomplete CDR (step 312). Thus, CDF 122 generates a second incomplete CDR for the session, and forwards the second incomplete CDR to a CGF 131-134 or BM system 140. Other CDFs 123-124 may generate additional incomplete CDRs for the session.

Although incomplete CDRs were generated by CDFs 121-122 as described above, there may be situations where a CDF generates a complete CDR. For example:

(1) CTF→ACR(start)→CDF1
(2) CTF←ACA←CDF1
(3) CTF→ACR(interim-1)→CDF1
(4) CTF does not receive a response
(5) CTF→ACR(interim-1) with T-flag set→CDF1 (retry)
(6) CTF←ACA←CDF1
(7) CTF→ACR(stop)→CDF1
(8) CTF←ACA←CDF1

When the CDF is generating a CDR, it has all the ACRs for the session and is able to generate a complete CDR. However, the ACR(interim-1) had the T-bit set, so the CDF may generate a CDR as using a potentially retransmitted ACR, populate the request IDs used in the CDR, and then include the payload for Interim-1 that came in with the T-bit set.

Figure 4:
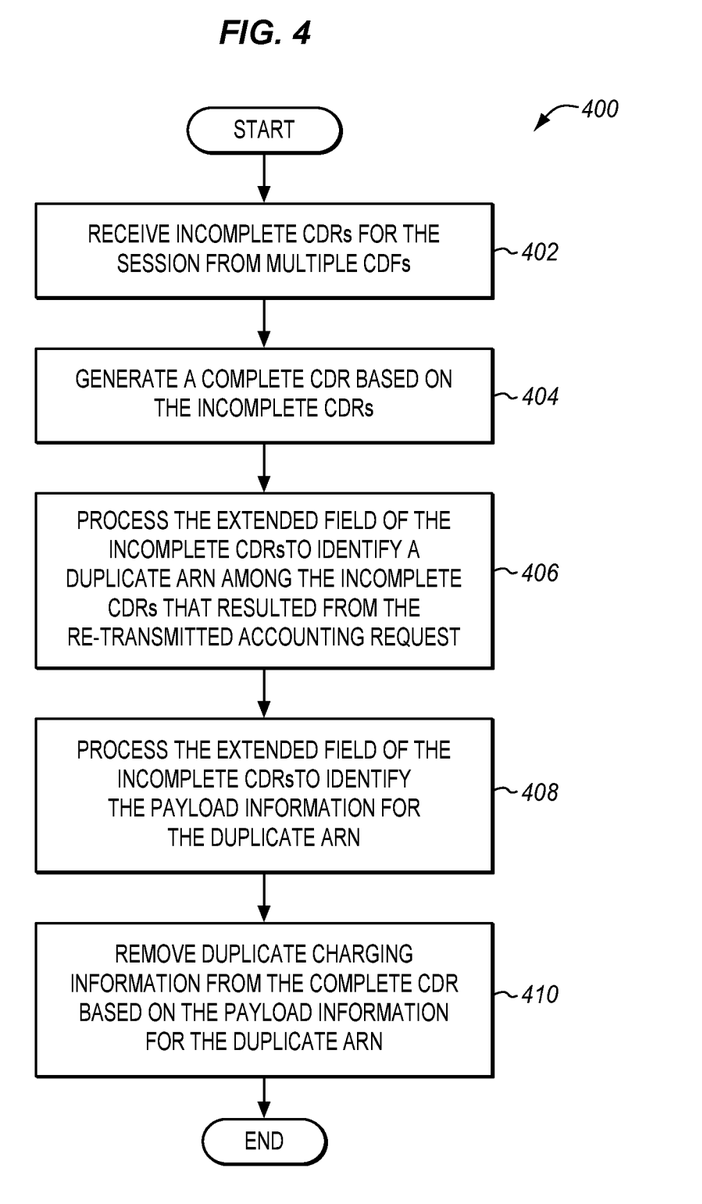
FIG. 4 depicts a flow chart illustrating a method for reconciling incomplete CDRs in an exemplary embodiment.

FIG. 4 depicts a flow chart illustrating a method 400 for reconciling incomplete CDRs in an exemplary embodiment. The steps of method 400 will be described with reference to the offline charging architecture 100 in FIGS. 1-2, but those skilled in the art will appreciate that method 400 may be performed in other systems. Also, the steps of the flow charts described herein are not all inclusive and may include other steps not shown, and the steps may be performed in an alternative order.

Reconciliation system 220 receives incomplete CDRs for the session from multiple CDFs, such as CDF 121 and CDF 122 (step 402). Reconciliation system 220 generates a complete CDR based on the incomplete CDRs (step 404). Reconciliation system 220 processes at least one of the extended fields of the incomplete CDRs to identify a request ID that is duplicated among two (or more) of the incomplete CDRs (step 406). For example, reconciliation system 220 may search through an extended field of the incomplete CDRs to identify an ARN that is inserted in two of the incomplete CDRs. When the same request ID is inserted in two CDRs, the cause was that the same accounting request is received by two different CDFs 121-124. For example, CDF 121 may receive an accounting request from CTF 104, but fails to acknowledge receipt of the accounting request. Thus, CDF 122 may receive the same accounting request that was re-transmitted by CTF 104. Because CDFs 121-122 operate according to method 300 above, each CDF 121-122 will construct a CDR using this accounting request, and will insert a request ID into the CDRs. When reconciliation system 220 identifies two incomplete CDRs that include the same request ID, this indicates that the same accounting request was used to build two different CDRs. There is a risk of doubling billing for the portion of the session being reported by this accounting request. Therefore, reconciliation system 220 processes an extended field of the incomplete CDRs to identify the content information related to the request ID found to be duplicated in two of the incomplete CDRs (step 408). Reconciliation system 220 then removes duplicate charging information from the complete CDR based on the content information related to the request ID found to be duplicated in two of the incomplete CDRs (step 410).

Figure 5:
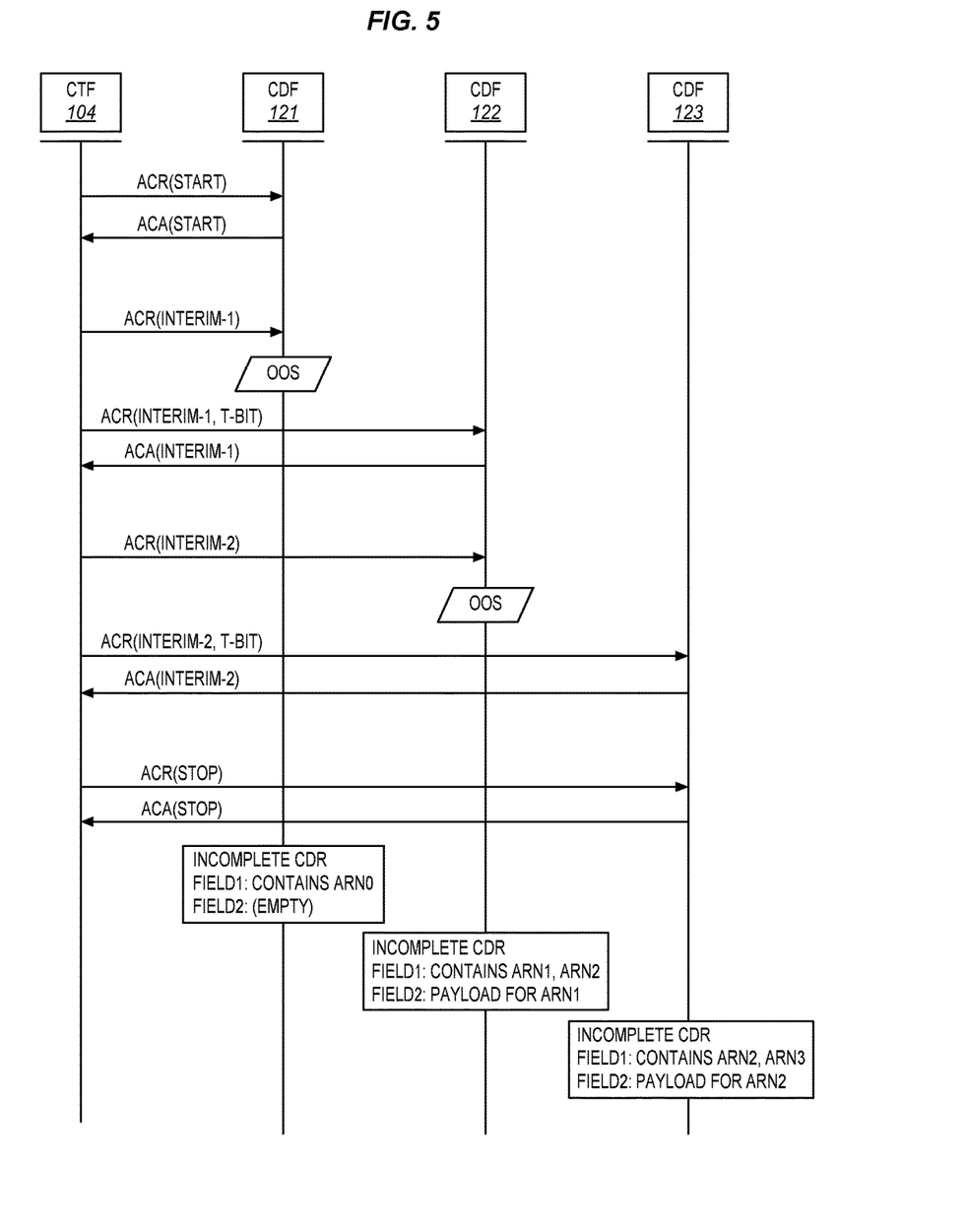
FIG. 5 is a message diagram illustrating a failover scenario in an exemplary embodiment.

Because reconciliation system 220 is able to remove charging information for an accounting request that has been used to construct more than one incomplete CDR, the network operator can avoid a situation where an end user is doubled billed for a session when a failover scenario occurs. FIG. 5 is a message diagram illustrating a failover scenario in an exemplary embodiment. To begin in FIG. 5, CTF 104 detects a chargeable event for a service provided by network element 102 for a session (see FIG. 1). CTF 104 assembles information for the chargeable event into a Diameter Rf ACR. The type of accounting for the service is session-based, so CTF 104 inserts a "start" value in the Accounting-Record-Type AVP of the ACR. The ACR(start) is also assigned an ARN, such as ARN0. CTF 104 then sends the ACR(start) to CDF 121 (such as through distributor unit 110). In response to receiving the ACR(start), CDF 121 processes the ACR(start) normally, and replies with a Diameter Rf ACA.

At a later time, CTF 104 detects another chargeable event, and assembles information for the chargeable event into another Diameter ACR for the session. CTF 104 inserts a record type into the Diameter request indicating the ACR as an "interim" message. The ACR(interim-1) is also assigned an ARN, such as ARN1. CTF 104 then sends the ACR (interim-1) to CDF 121 (such as through distributor unit 110). After receiving the ACR(interim-1), CDF 121 goes out-of-service (OOS) and is not able to reply to the ACR (interim-1) with an ACA. Because no acknowledgment is received from CDF 121, CTF 104 may retry delivery of the ACR(interim-1) to CDF 121 one or more times. After a set time or a number of retries, CTF 104 fails over to CDF 122. Thus, CTF 104 sets to T-bit of the ACR(interim-1) to indicate that this ACR is potentially re-transmitted, and sends the ACR(interim-1) to CDF 122. In response to receiving the ACR(interim-1), CDF 122 processes the ACR (interim-1) normally, and replies with an ACA.

At a later time, CTF 104 detects another chargeable event, and assembles information for the chargeable event into another ACR for the session. CTF 104 inserts a record type into the Diameter request indicating the ACR as an "interim" message. The ACR(interim-2) is also assigned an ARN, such as ARN2. CTF 104 then sends the ACR(interim-2) to CDF 122 (such as through distributor unit 110). At this time, CDF 122 is OOS and is not available to receive any requests. Therefore, CDF 122 does not reply to the ACR(interim-2) with an ACA. CTF 104 may retry delivery of the ACR (interim-2) to CDF 122 one or more times. After a set time or a number of retries, CTF 104 fails over to CDF 123. Thus, CTF 104 sets to T-bit of the ACR(interim-1) to indicate that this ACR is potentially re-transmitted, and sends the ACR (interim-1) to CDF 123. In response to receiving the ACR (interim-2), CDF 123 processes the ACR(interim-2) normally, and replies with an ACA.

At a later time, CTF 104 detects another chargeable event, and assembles information for the chargeable event into another ACR for the session. CTF 104 inserts a record type into the Diameter request indicating the ACR as a "stop" message. The ACR(stop) is also assigned an ARN, such as ARN3. CTF 104 then sends the ACR(stop) to CDF 123 (such as through distributor unit 110). In response to receiving the ACR(stop), CDF 123 processes the ACR(stop) normally, and replies with an ACA. This marks the end of the accounting session.

During or after the session, CDFs 121-123 each generate an incomplete CDR for the session. For instance, CDF 121 generates an incomplete CDR for the session based on the ACR(start). CDF 121 identifies an ARN (i.e., request identifier (ID)) assigned to the ACR(start), which is ARN0, and inserts ARN0 in an extended field of the incomplete CDR. CDF 121 also determines whether one or more of the ACRs used to generate the incomplete CDR was indicated as a re-transmitted ACR by CTF 104. In this example, the ACR(start) was not indicated as re-transmitted, so CDF 121 does not need to insert content information for any ACR in an extended field of the incomplete CDR.

CDF 122 generates another incomplete CDR for the session based on the ACR(interim-1) and ACR(interim-2). CDF 122 identifies the ARNs assigned to the ACR(interim-1) and ACR(interim-2), which are ARN1 and ARN2. CDF 122 inserts ARN1 and ARN2 in an extended field of the incomplete CDR. CDF 122 also determines whether one or more of the ACRs used to generate the incomplete CDR was indicated as a re-transmitted ACR by CTF 104. In this example, the ACR(interim-1) was indicated as re-transmitted, so CDF 122 inserts content information (e.g., payload) for ACR(interim-1) in an extended field of the incomplete CDR. The content information for ACR(interim-1) may be identified by ARN1.

CDF 123 generates another incomplete CDR for the session based on the ACR(interim-2) and ACR(stop). CDF 123 identifies the ARNs assigned to the ACR(interim-2) and ACR(stop), which are ARN2 and ARN3. CDF 124 inserts ARN2 and ARN3 in an extended field of the incomplete CDR. CDF 123 also determines whether one or more of the ACRs used to generate the incomplete CDR was indicated as a re-transmitted ACR by CTF 104. In this example, the ACR(interim-2) was indicated as re-transmitted, so CDF 123 inserts content information (e.g., payload) for ACR (interim-2) in an extended field of the incomplete CDR. The content information for ACR(interim-2) may be identified by ARN2.

Figure 6:
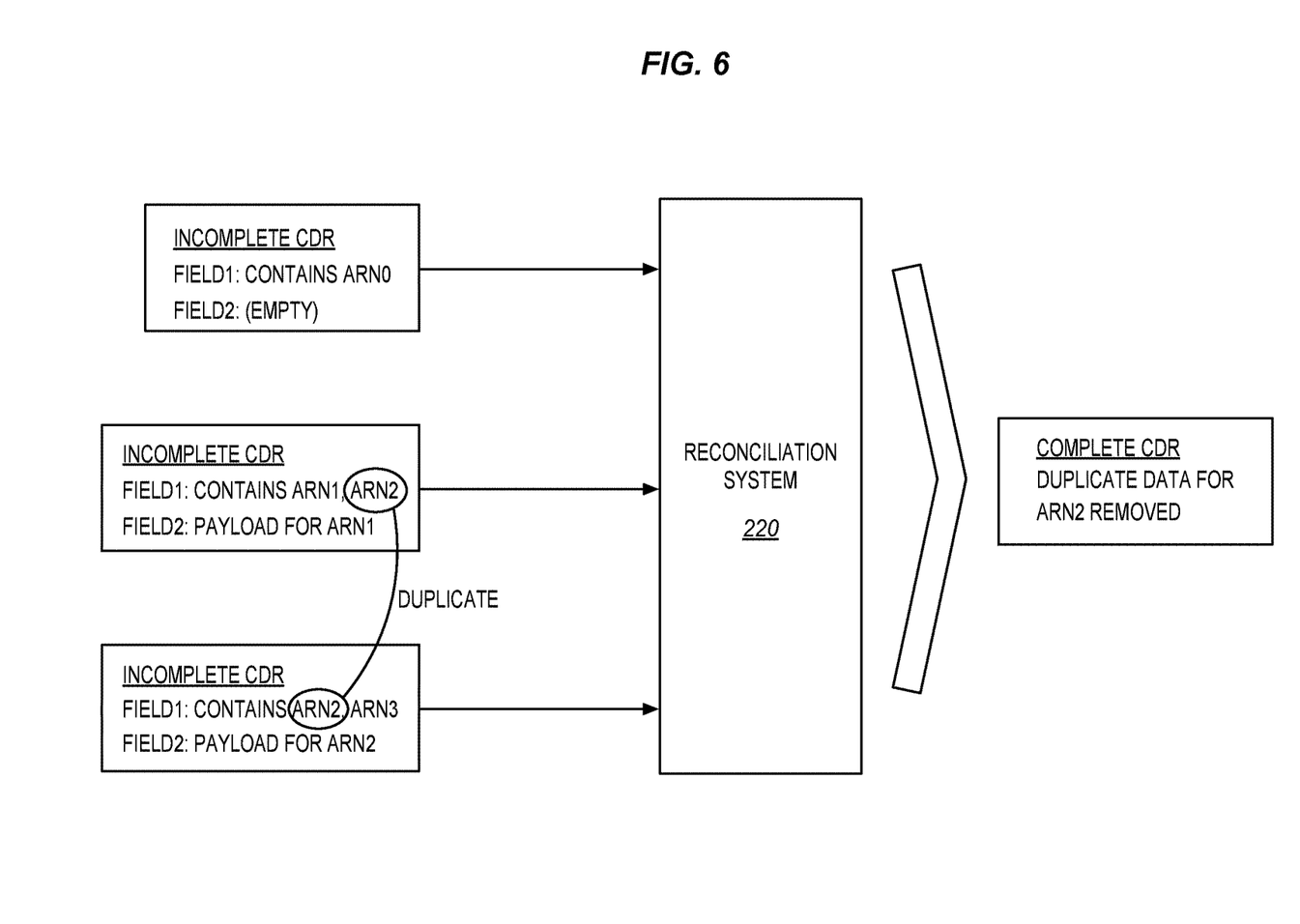
FIG. 6 illustrates reconciliation of incomplete CDRs in an exemplary embodiment.

CDFs 121-123 forward the incomplete CDRs to reconciliation system 220 (e.g., a CGF 131-134 or BM system 140). FIG. 6 illustrates reconciliation of the incomplete CDRs in an exemplary embodiment. Reconciliation system 220 receives the incomplete CDRs 601-603 from CDFs 121-123. Reconciliation system 220 generates a complete CDR 604 based on the incomplete CDRs 601-603. Reconciliation system 220 processes the extended fields of the incomplete CDRs 601-603 to identify an ARN (or ARNs) that is duplicated among two (or more) of the incomplete CDRs 601-603. When reconciliation system 220 identifies two incomplete CDRs 601-603 that include the same ARN, this indicates that the same ACR was used to build two different CDRs. In this example, reconciliation system 220 identifies ARN2 as a duplicate record in CDRs 602-603. Therefore, the charging information related to ARN2 has been used in two separate CDRs.

To avoid double billing, reconciliation system 220 processes an extended field of the incomplete CDRs 601-603 to identify the content information related to the ARN found to be duplicated in two of the incomplete CDRs 602-603. Incomplete CDR 603 includes the payload for the ACR (interim-2) related to ARN2. For example, the payload for the ACR(interim-2) may include a start timestamp, an end timestamp, Session Description Protocol (SDP) information, etc., for a chargeable event as indicated in an Attribute Value Pair (AVP) of the ACR(interim-2). Reconciliation system 220 then removes duplicate charging information from the complete CDR 604 based on the payload related to ARN2. The process of removing duplicate charging information includes recognition of repeated ARN(s) in CDRs that pertain to a failed-over session, and adjusting the time-stamps (e.g., delivery time stamps and timestamp fractions are aligned with the information contained in the ListOfRetransmittedRecords such that the start time stamp coincides with the serviceDeliveryEndTimeStamp and fraction in the ListOfRetransmittedRecords for ARN2 and the service delivery end time stamp remains unchanged, as before from ARN3). The process of removing duplicate charging information may also include adjusting SDP Media Components such that the reported SDP Media Components for a CDR considers the previously reported CDR (in time sequence), and the subsequent CDR to extract out the SDP Media Components exclusively established by a re-transmitted ACR. The process of removing duplicate charging information may also include adjusting aggregated counters, per container reported in case of SDC and TDV, for data uploads and downloads for an end user such that containers of each type that are reported more than once are subtracted from the aggregated count, using the payload information.

To support the embodiments described herein, the CDR structure may be extended to include at least two new fields. One field is defined to list ARNs or other request IDs for ACRs used to generate a CDR. Another field is defined to indicate content information for ACRs that are used to generate a CDR, and were indicated as re-transmitted. The following provides an example CDR structure for an Application Server (AS) record. A similar enhancement applies to all other CDR records that contain information about "re-transmission" (e.g., SCSCF/PCSCF/ICSCF Records, MRFC Record, BGCF Record, ECSCF Record, IBCF Record, TRF Record, TF Record and ATCF Record).

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

```
ASRecord              ::= SET
{
   recordType                            [0] RecordType,
   retransmission                        [1] NULL OPTIONAL,
   sIP-Method                            [2] SIP-Method OPTIONAL,
   role-of-Node                          [3] Role-of-Node OPTIONAL,
   ...
   ...
   initialIMS-Charging-Identifier        [105] IMS-Charging-Identifier OPTIONAL,
   list-Of-AccessTransferInformation     [106] SEQUENCE OF
AccessTransferInformation OPTIONAL,
   retransmitted-records-used            [200] ListOfRetransmittedRecords
OPTIONAL,
   contained-ARN                         [201] ListOfContainedARN OPTIONAL
}
The extended fields may be defined as:
ListOfRetransmittedRecords ::= SEQUENCE
--
-- Each re-transmitted ACR is identified with its payload information included in the CDR
--
{
   acct-Record-Number                    [0] INTEGER,
   list-Of-Calling-Party-Address         [1] ListOfInvolvedParties OPTIONAL,
   called-Party-Address                  [2] InvolvedParty OPTIONAL,
   serviceRequestTimeStamp               [3] TimeStamp OPTIONAL,
   serviceDeliveryStartTimeStamp         [4] TimeStamp OPTIONAL,
   serviceDeliveryEndTimeStamp           [5] TimeStamp OPTIONAL,
   serviceRequestTimeStampFraction       [6] Milliseconds OPTIONAL,
   serviceDeliveryStartTimeStampFraction [7] Milliseconds OPTIONAL,
   serviceDeliveryEndTimeStampFraction   [8] Milliseconds OPTIONAL,
   list-Of-SDP-Media-Components          [9] SEQUENCE OF Media-
Components-List OPTIONAL
}
ListOfContainedARN ::= SEQUENCE
--
-- Each ARN that is addressed in the CDR is separately reported
--
{
   acct-Record-Number                    [0] INTEGER
}
```

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Although specific embodiments were described herein, the scope of the disclosure is not limited to those specific embodiments. The scope of the disclosure is defined by the following claims and any equivalents thereof.

We claim:

1. A system comprising:
   at least one processor configured to implement a plurality of Charging Data Functions (CDFs) of an Offline Charging System (OFCS);
   a first CDF of the plurality is configured to receive accounting requests for a session from a Charging Trigger Function (CTF);
   the first CDF is configured to generate a first incomplete Charging Data Record (CDR) for the session based on the accounting requests, to identify request identifiers (ID) assigned to the accounting requests used to generate the first incomplete CDR, and to insert the request IDs in a first extended field of the first incomplete CDR;

the first CDF is configured to determine whether at least one of the accounting requests used to generate the first incomplete CDR was indicated as a re-transmitted accounting request by the CTF;
the first CDF is configured to insert content information for the re-transmitted accounting request in a second extended field of the first incomplete CDR;
the first CDF is configured to forward the first incomplete CDR to a reconciliation system.

2. The system of claim 1 wherein:
the first CDF is configured to insert payload from the re-transmitted accounting request in the second extended field of the first incomplete CDR.

3. The system of claim 2 wherein:
the payload comprises at least a start timestamp and an end timestamp for a chargeable event as indicated in an Attribute Value Pair (AVP) of the re-transmitted accounting request.

4. The system of claim 1 wherein:
the first CDF is configured to insert a pointer in the second extended field of the first incomplete CDR, wherein the pointer points to a shared data storage that stores payload from the re-transmitted accounting request.

5. The system of claim 1 wherein:
the accounting requests comprise Diameter Accounting Requests (ACRs); and
the first CDF is configured to process a T-bit of a command flags field of the ACRs to determine that at least one of the ACRs was indicated as a re-transmitted ACR by the CTF.

6. The system of claim 5 wherein:
the request IDs comprise Accounting Record Numbers (ARN) assigned to the ACRs.

7. The system of claim 1 further comprising:
the reconciliation system configured to receive incomplete CDRs from the first CDF and a second CDF of the plurality, to generate a complete CDR based on the incomplete CDRs, to process the first extended field of the incomplete CDRs to identify a request ID that is duplicated among two of the incomplete CDRs, to process the second extended field of the incomplete CDRs to identify the content information related to the request ID found to be duplicated among two of the incomplete CDRs, and to remove duplicate charging information from the complete CDR based on the content information related to the duplicate request ID.

8. The system of claim 7 wherein:
the reconciliation system comprises a Charging Gateway Function (CGF) of the OFCS.

9. The system of claim 7 wherein:
the reconciliation system comprises a Billing Mediation (BS) system that connects to the OFCS.

10. A method of performing offline charging in an Offline Charging System (OFCS) that includes a plurality of Charging Data Functions (CDFs), the method comprising:
receiving, in a first CDF of the plurality, accounting requests for a session from a Charging Trigger Function (CTF);
generating, at the first CDF, a first incomplete Charging Data Record (CDR) for the session based on the accounting requests;
identifying, at the first CDF, request identifiers (ID) assigned to the accounting requests used to generate the first incomplete CDR;
inserting, at the first CDF, the request IDs in a first extended field of the first incomplete CDR;
determining, at the first CDF, whether at least one of the accounting requests used to generate the first incomplete CDR was indicated as a re-transmitted accounting request by the CTF;
inserting, at the first CDF, content information for the re-transmitted accounting request in a second extended field of the first incomplete CDR; and
forwarding the first incomplete CDR from the first CDF to a reconciliation system.

11. The method of claim 10 wherein inserting content information for the re-transmitted accounting request in a second extended field of the first incomplete CDR comprises:
inserting payload from the re-transmitted accounting request in the second extended field of the first incomplete CDR.

12. The method of claim 11 wherein:
the payload comprises at least a start timestamp and an end timestamp for a chargeable event as indicated in an Attribute Value Pair (AVP) of the re-transmitted accounting request.

13. The method of claim 10 wherein inserting content information for the re-transmitted accounting request in a second extended field of the first incomplete CDR comprises:
inserting a pointer in the second extended field of the first incomplete CDR, wherein the pointer points to a shared data storage that stores payload from the re-transmitted accounting request.

14. The method of claim 10 wherein:
the accounting requests comprise Diameter Accounting Requests (ACRs); and
determining whether at least one of the accounting requests used to generate the first incomplete CDR was indicated as a re-transmitted accounting request comprises processing a T-bit of a command flags field of the ACRs.

15. The method of claim 14 wherein:
the request IDs comprise Accounting Record Numbers (ARN) assigned to the ACRs.

16. The method of claim 10 further comprising:
receiving, at the reconciliation system, incomplete CDRs from the first CDF and a second CDF of the plurality;
generating, at the reconciliation system, a complete CDR based on the incomplete CDRs;
processing, at the reconciliation system, the first extended field of the incomplete CDRs to identify a request ID that is duplicated among two of the incomplete CDRs;
processing, at the reconciliation system, the second extended field of the incomplete CDRs to identify the content information related to the request ID found to be duplicated among two of the incomplete CDRs; and
removing, at the reconciliation system, duplicate charging information from the complete CDR based on the content information related to the duplicate request ID.

17. The method of claim 16 wherein:
the reconciliation system comprises a Charging Gateway Function (CGF) of the OFCS.

18. The method of claim 16 wherein:
the reconciliation system comprises a Billing Mediation (BS) system that connects to the OFCS.

19. A non-transitory computer readable medium embodying programmed instructions executed by at least one processor to implement a plurality of Charging Data Functions (CDFs) of an Offline Charging System (OFCS), wherein the instructions direct the processor to:

receive accounting requests for a session from a Charging Trigger Function (CTF);
generate a first incomplete Charging Data Record (CDR) for the session based on the accounting requests;
identify request identifiers (ID) assigned to the accounting requests used to generate the first incomplete CDR;
insert the request IDs in a first extended field of the first incomplete CDR;
determine whether at least one of the accounting requests used to generate the first incomplete CDR was indicated as a re-transmitted accounting request by the CTF;
insert content information for the re-transmitted accounting request in a second extended field of the first incomplete CDR; and
forward the first incomplete CDR to a reconciliation system.

20. The computer readable medium of claim 19 wherein the at least one processor further implements a plurality of Charging Gateway Functions (CGFs) of the OFCS, wherein the instructions direct the processor to:
receive incomplete CDRs from a first CDF and a second CDF of the plurality of CDFs;
generate a complete CDR based on the incomplete CDRs;
process the first extended field of the incomplete CDRs to identify a request ID that is duplicated among two of the incomplete CDRs;
process the second extended field of the incomplete CDRs to identify the content information related to the request ID found to be duplicated among two of the incomplete CDRs; and
remove duplicate charging information from the complete CDR based on the content information related to the duplicate request ID.

* * * * *